United States Patent [19]

Hing et al.

[11] Patent Number: 4,549,129
[45] Date of Patent: Oct. 22, 1985

[54] REGULATOR CIRCUIT

[75] Inventors: Samath Hing, Gland, Switzerland; Michel Guillien, Gex, France

[73] Assignee: Motorola, Inc., Schaumburg, Ill.

[21] Appl. No.: 485,818

[22] Filed: Apr. 18, 1983

[30] Foreign Application Priority Data

Apr. 29, 1982 [GB] United Kingdom ............... 8212403

[51] Int. Cl.[4] .............................................. G05F 1/58
[52] U.S. Cl. ..................................... 323/276; 323/224; 323/280
[58] Field of Search .............. 323/273, 275, 279, 280, 323/281, 224, 268, 276, 312, 317, 908, 299, 303

[56] References Cited

U.S. PATENT DOCUMENTS 4,038,594  7/1977  Quinn et al. .................. 323/280

FOREIGN PATENT DOCUMENTS 56-7119    1/1981  Japan ............................ 323/276
1432024    4/1976  United Kingdom ............. 323/276
SU658543   5/1979  U.S.S.R. ....................... 323/276
SU892435  12/1981  U.S.S.R. ....................... 323/276

Primary Examiner—Peter S. Wong
Assistant Examiner—Judson H. Jones
Attorney, Agent, or Firm—Joe E. Barbee

[57] ABSTRACT

The described invention relates to a regulator circuit.

A transistor Q1 receives at an input terminal 1 an input voltage having D.C. and A.C. components and provides a regulated D.C. output voltage at an output terminal 4. The transistor Q1 lies in the negative feedback path of an operational amplifier 6 between an output 9 and an input 5 of that amplifier. The amplifier 6 also has a reference voltage input 8. A second operational amplifier 19 also receives the reference voltage at one input 20 and at its other input 18 receives a D.C. potential representative of the D.C. input component and has an output terminal 21 coupled to the output terminal 4 in such a manner as to regulate the value of the D.C. input component by control of current drawn through the transistor Q1. A third operational amplifier 32 also receives the reference voltage at one input 33 and at a second input 31 receives the A.C. component of the input voltage and passes the A.C. component to the output terminal through the first operational amplifier 6 and the transistor Q1.

The regulator circuit is particularly applicable to a telephone speech circuit and is compatible with integrated circuit technology.

18 Claims, 3 Drawing Figures

REGULATOR CIRCUIT

This invention relates to a regulator circuit and particularly but not exclusively to a voltage regulator suitable for use in a telephone speech circuit.

A telephone speech circuit forms part of a subscribers telephone and couples the telephone handset to the subscribers line. The subscribers line carries both a D.C. voltage and an A.C. speech signal and is usually connected to the speech circuit via a diode bridge which provides an A.C. speech signal superimposed on a D.C. level.

The subscribers line may be either relatively short having a low impedance or may be long with a high impedance. The line couples a subscriber to a central station which has a line supply potential source. The length of the subscribers line will determine the actual D.C. potential which is presented to the speech circuit.

It is advantageous to provide a speech circuit, as far as is possible in integrated circuit form and the potential applied to this integrated circuit must not be too large so as to avoid damage.

Some control stations can have supply potentials as high as 96 V and with a short line this would result in an undesirably large potential being applied to the speech circuit integrated circuit. However, the potential available at the speech circuit must be sufficiently large to provide sufficient line current to activate a so-called "off hook" relay in the central station. This current must not also be too high so as to damage or keep "on" the relay.

Clearly some regulation is required within the speech circuit and it would be advantageous for the regulator which provides this regulation to be compatible with integrated circuit technology and to include as few components as possible which cannot be included on an integrated circuit chip.

This invention seeks to provide a regulator circuit suitable for use in a telephone speech circuit and which has a substantial compatibility with integrated circuit technology.

According to the present invention there is provided a regulator circuit comprising an input terminal for receiving a D.C. input potential, a transistor having an input electrode coupled to the input terminal and an output terminal for providing a regulated D.C. output potential; an operational amplifier having a first input terminal, a second input terminal coupled to a reference potential line, and an output terminal, and a negative feedback path coupled between the output terminal of the operational amplifier and its first input terminal through the said transistor as a control element.

The said transistor may have an emitter electrode which forms the input electrode, a collector electrode which forms the output electrode and a base electrode, the collector electrode being coupled to the first input terminal of the operational amplifier and the output terminal of the operational amplifier being coupled to the base electrode of the transistor.

The collector electrode of the transistor may be coupled to the first terminal of the operational amplifier through a resistor.

The output terminal of the operational amplifier may be coupled to the base electrode of the said transistor through a second transistor having a base electrode coupled to the output terminal of the operational amplifier, an emitter electrode coupled to a supply potential line and a collector electrode coupled to the base electrode of the said transistor.

A second operational amplifier may be provided having a first input terminal coupled to receive a D.C. signal representative of the D.C. input potential at the said input terminal; a second input terminal coupled to the said reference potential line and an output terminal coupled to control current flowing in a current path coupled to the said output terminal of the regulator circuit whereby the D.C. input potential appearing at the input terminal is requlated.

The current path may include a transistor control element having a collector electrode coupled to the output terminal of the regulator circuit an emitter electrode coupled to a supply potential line and a base electrode coupled to the output terminal of the second operational amplifier.

Means may be provided for limiting current flowing in the said current path.

The means for limiting the current flowing in the said current path may comprise a further transistor having an emitter electrode coupled to a supply potential line, a collector electrode coupled to the output terminal of the second operational amplifier and a base electrode coupled to the emitter electrode of the transistor control element.

The regulator circuit may be operative to transfer A.C. signals between the input and output terminals of the circuit and may comprise a third operational amplifier having a first input terminal coupled to receive A.C. signals present at the input terminal of the regulator circuit, a second input coupled to the said reference potential line; and output terminal coupled to the first input terminal of the said operational amplifier and negative feedback means coupled between its output terminal and its first input terminal.

The negative feedback means may comprise a resistor.

The output terminal of the third operational amplifier may be coupled to the first input terminal of the said operational amplifier through a resistor.

An exemplary embodiment of the invention will now be described with reference to the drawings in which.

Figure 1:
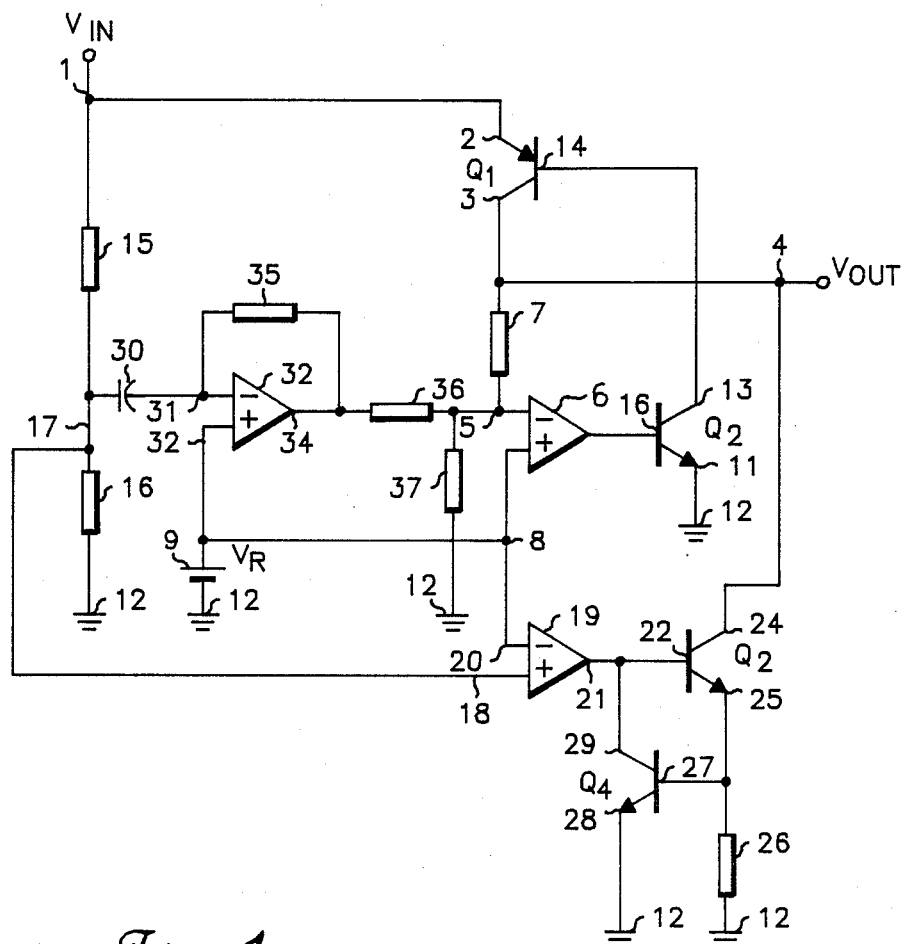
FIG. 1 illustrates a regulator circuit in accordance with the present invention.

Referring now to FIG. 1 the regulator circuit illustrated forms part of a telephone speech circuit which is coupled to a central exchange station via a subscriber line. The subscriber line is connected to the speech circuit via a diode bridge (not shown) and a D.C. potential together with A.C. speech signals appear at an input terminal 1. The input terminal 1 is coupled to emitter electrode 2 of a transistor Q1 whose collector electrode 3 is connected to an output terminal 4 at which appears a regulated D.C. output voltage. The collector electrode 3 of the transistor Q1 is also coupled to a first and inverting input 5 of an operational amplifier 6 via a resistor 7. The operational amplifier 6 has a second and non-inverting input 8 which is coupled to a reference potential supply 9.

The operational amplifier 6 has an output terminal coupled to a base electrode 10 of a transistor Q2. The transistor Q2 has an emitter electrode 11 connected to a potential supply line 12 and has a collector electrode 13 connected to a base electrode 14 of the transistor Q1. The input terminal 1 is also connected to one end of a potential divider chain formed by two series connected resistors 15 and 16. The other end of the chain is formed by a terminal of the resistor 16 which is coupled to the potential supply line 12. A junction point 17 between the resistors 15 and 16 is connected to a non-inverting input 18 of a second operational amplifier 19 whose second and inverting input 20 is connected to the second input terminal 8 of the operational amplifier 6 and to the reference potential 9.

The operational amplifier 19 has an output terminal 21 connected to a base electrode 22 of a transistor Q3 whose collector electrode 24 is connected to the output terminal 4 and whose emitter electrode 25 is coupled to the supply line potential 12 through a resistor 26.

The emitter electrode 25 of the transistor Q3 is connected to a base electrode 27 of a current limiting transistor Q4 whose emitter electrode 28 is connected to the supply line potential 12 and whose collector electrode 29 is coupled to the output terminal 21 of the operational amplifier 19 and hence to the base electrode 22 of the transistor Q3.

The junction point 17 between the resistors 15 and 16 is also coupled via a capacitor 30 to a first and inverting input 31 of a third operational amplifier 32 whose second and non-inverting input 33 is also coupled to the reference potential supply 9. The operational amplifier 32 has an output terminal 34 and a resistor 35 is coupled between this output terminal 34 and the first input terminal 31 of the operational amplifier 32 in order to provide negative feedback.

The output terminal 34 of the operational amplifier 32 is coupled to the first input terminal 5 of the operational amplifier 6 through a series resistor 36. Finally a resistor 37 couples the input terminal 5 of the operational amplifier 6 with the supply line potential 12.

In operation input signals will appear at the input terminal 1. In the present example of a telephone speech circuit these signals will include both A.C. speech signals and a D.C. potential fed from the central station. The A.C. signals will be fed through the capacitor 30 and after amplification by the operational amplifiers 32 and 6 will appear at the output terminal 4 being fed to that terminal by the transistors Q2 and Q1. A.C. characteristics of the illustrated regulator circuit will be discussed in due course.

Consider now the operation of the regulator circuit from a D.C. point of view and allotting the resistors 15, 16,35,36,37 and 7 the values R1, R2, R3, R4, R5 and R6 respectively and assuming that the D.C. input voltage appearing at the terminal 1 has a value $V_{IN}$, the output voltage appearing at the output terminal 4 has a value $V_{OUT}$ and the reference potential source 9 has a supply potential $V_R$ then D.C. operation is as follows.

Both the amplifiers 32 and 6 are provided with negative feedback loops. The amplifier 32 has a negative feedback loop connected between its output terminal 34 and its input terminal 31, which is an inverting input terminal, via the resistor 35. The amplifier 6 has a negative feedback loop from its output terminal 9 through the transistor Q2 and through the transistor Q1 as a control element to its input terminal 5 which is an inverting input. The two negative feedback loops ensure that a stable state is reached in which the D.C. potential at the output 34 of the amplifier 32 equals the D.C. potential at the input terminal 5 of the operational amplifier 6. The value of this potential at these terminals is equal to the potential $V_R$ of the reference potential source 9 which is applied to the input terminal 33 of the operational amplifier 32 and the input terminal 8 of the amplifier 6. Consequently no D.C. current flows through the resistor 36.

Figure 2:
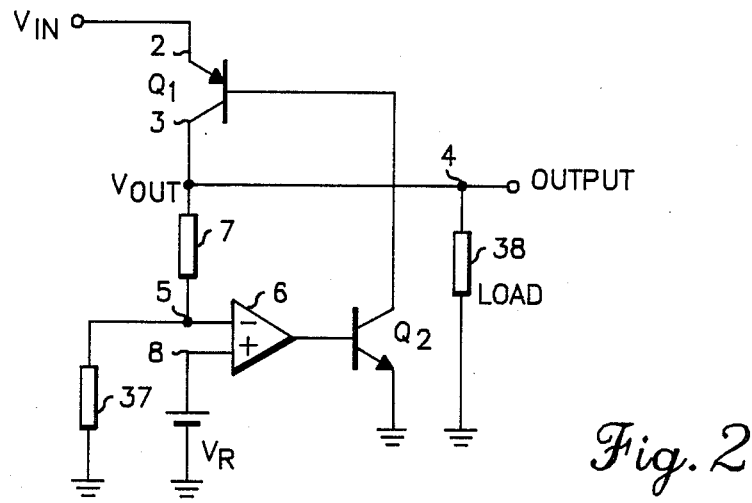
FIG. 2 is an equivalent circuit for the embodiment of FIG. 1 in respect of output D.C. voltage regulation

In respect of the D.C. output voltage regulation characteristics, the circuit of FIG. 1 can be reduced to an equivalent circuit illustrated in FIG. 2 where like parts to those in FIG. 1 bear like reference numerals. This circuit is considered to be self-explanatory.

The collector current of the transistor Q1 is controlled by the amplifier 6 through the transistor Q2 so that the output potential $V_{OUT}$ appearing at the output terminal 4 is a regulated D.C. output potential which is given by $$V_{OUT} = V_R\left(1 + \frac{R6}{R5}\right)$$

and this potential will be regulated at that value whatever load is applied to the output terminal 4. In FIG. 2 this load is illustrated as a load resistor 38.

Figure 3:
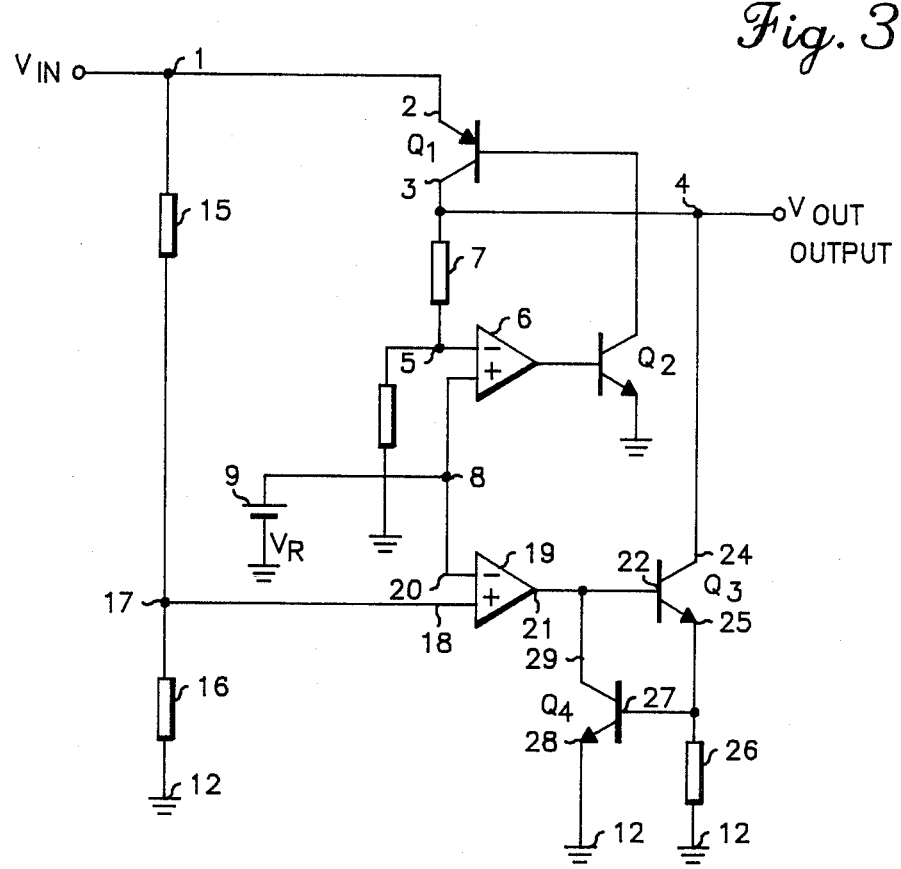
FIG. 3 is an equivalent circuit of the embodiment of FIG. 1 in respect of input D.C. voltage regulation.

Since the inverting input 31 of the operational amplifier 32 is held at the reference potential $V_R$ this input terminal is a virtual ground and therefore the resistors 15 and and 16 together with the capacitor 30 build a low-pass filter which effectively provides at the junction point 17 between the resistors 15 and 16 a potential which represents the D.C. input potential $V_{IN}$. In respect of the regulation of the D.C. input voltage the circuit of FIG. 1 reduces to an equivalent circuit shown in FIG. 3 where like parts to those in FIG. 1 bear like reference numerals and which figure is also considered to be self-explanatory. The D.C. input potential $V_{IN}$ will be regulated to a value given by $$V_{IN} = V_R\left(1 + \frac{R1}{R2}\right).$$

Assume that the D.C. input potential $V_{IN}$ becomes higher than the regulated value then the operational amplifier 19 will cause the transistor Q3 to pass more current, which current will be drawn from the output terminal 4 to which the collector 24 of the transistor Q3 is connected. Since as has already been described the output voltage appearing at the terminal 4 is regulated the additional current required by the transistor Q3 will be provided by the transistor Q1.

The current supplied by the transistor Q1 is also flowing through the emitter 2 of that transistor and through the subscriber line to which the input terminal 1 is connected. Consequently when the current through the transistors Q3 and Q1 increases the D.C. potential $V_{IN}$ presented at the input terminal 1 will decrease until the final regulated value of $V_{IN}$ given above is reached.

The resistor 26 connected in the emitter circuit of the transistor Q3 and the transistor Q4 act to limit the collector current of the transistor Q3. Once the maximum limited value of the current through the transistor Q3 is reached the value of the input potential $V_{IN}$ is allowed to increase. This would be the situation for a short subscriber line in which the line impedance is small.

Consider now the A.C. voltage transfer properties of the circuit of FIG. 1. Assume that the A.C. voltage appearing at the input terminal 1 is $v_{in}$ and that the A.C.

voltage appearing at the output terminal 34 of the operational amplifier 32 is $v_2$ then $$v_2 = -v_{in}\frac{R3}{R1}$$

The A.C. voltage $v_2$ appearing at the output terminal 34 of the operational amplifier 32 will be transferred to the output terminal 4 by the operational amplifier 6 and the transistors Q2 and Q1 with a value $v_{out}$ given by $$v_{out} = -v_2\frac{R6}{R4}$$

and therefore $$v_{out} = v_{in}\frac{R6}{R4}\frac{R3}{R1}$$

The values of the resistors R1, R3, R4 and R6 maybe chosen so that $v_{out}=v_{in}$.

If the output voltage at the terminal 4 is varied, e.g. is increased, then the voltage at the inverting input terminal of the operational amplifier 6 will also increase forcing the transistor Q2 to pass a lower value of collector current. This in turn causes a decrease in the emitter current of the transistor Q1 which causes the A.C. input voltage $v_{in}$ to increase. This increase results in a lowering of the A.C. voltage appearing at the output terminal 34 of the operational amplifier 32 and this reduction in voltage continues until a balance is reached when $$v_2 = -v_{out}\frac{R4}{R6} \text{ and } v_{in} = -v_2\frac{R1}{R3}$$

Choosing $$\frac{R6}{R4} \times \frac{R3}{R1} = 1 \text{ yields } v_{in} = v_{out}$$

Consequently the output voltage is transferred to the input.

As shown above any A.C. voltage which is present at the input terminal 1 is transferred to the output terminal 4 and vice versa. With the value R1 of the resistor 15 chosen to be of a very high value then current flowing at the input terminal 1 passes almost entirely through the collector-emitter current path of the transistor Q1. If the collector and emitter currents of the transistor Q1 are given by $i_c$ and $i_e$ respectively then $i_e$ is approximately equal to $i_c$.

The input impedance of the circuit is defined as $$Z_{IN} = \frac{v_{in}}{i_e}$$

and the output impedance as $$Z_{out} = \frac{v_{out}}{i_c}.$$

Since $v_{out}=v_{in}$ and $i_e=i_c$ then $Z_{IN}=Z_{OUT}$. This relationship remains true even if the transistor Q1 saturates provided that the base current of the transistor is a D.C. current with no A.C. components.

If the value of $$\frac{R6}{R4} \times \frac{R3}{R1}$$

were not to be chosen to be equal to 1 then $$Z_{IN} = Z_{OUT} \cdot \frac{R4}{R6} \cdot \frac{R3}{R1}.$$

As described the circuit arrangement of FIG. 1 provides a regulator circuit suitable for use in a telephone speech circuit and in which several basic functions are achieved. These are 1. to regulate the D.C. voltage at the output terminal at a low value compatible with integrated circuit technology.
2. to regulate the D.C. voltage at the input terminal at a higher value with current limitation.
3. to transfer any A.C. voltage generated at the input to the output.
4. to transfer any A.C. voltage generated at the utput to the input.
5. to load the A.C. input signal by an impedance equivalent to the output load and
6. to load the A.C. output signal by the impedance equivalent to the impedance of the subscriber line to which the circuit is connected.

A large portion of the described circuit is compatible with integrated circuit technology and when used as part of a telephone speech circuit all components with the exception of the resistor 15, the capacitor 30 and the transistors Q1 and Q2 may be provided as an integrated circuit.

Although the regulator circuit has been described with particular reference to its use as part of a telephone speech circuit this is not essential and the circuit may be useful in other applications in which D.C. input and output voltages required regulation and A.C. signals are transferred between input and output terminals.

We claim:

1. A regulator circuit comprising:
an input terminal for receiving a D.C. input potential;
a transistor having an input electrode coupled to the input terminal and an output terminal for providing a regulated D.C. output potential;
an operational amplifier having a first input terminal, a second input terminal coupled to a reference potential line, and an output terminal;
a negative feedback path coupled between the output terminal of the operational amplifier and its first input terminal through said transistor as a control element; and
a second operational amplifier having a first input terminal coupled to receive a D.C. signal representative of the D.C. input potential at said input terminal, a second input terminal coupled to said reference potential line and an output terminal coupled to control current flowing in a current path coupled to said output terminal of the regulator circuit, whereby the D.C. input potential appearing at the input terminal of the regulator circuit is regulated.

2. The regulator circuit as claimed in claim 1 wherein said transistor has an emitter electrode which forms the input electrode, a collector electrode which forms the output electrode, and a base electrode, the collector electrode being coupled to the first input terminal of the operational amplifier and the output terminal of the operational amplifier being coupled to the base electrode of the transistor.

3. The regulator circuit as claimed in claim 2 wherein the collector electrode of the transistor is coupled to the first terminal of the operational amplifier through a resistor.

4. The regulator circuit as claimed in claim 2 wherein the output terminal of the operational amplifier is coupled to the base electrode of said transistor through a second transistor having a base electrode coupled to the output terminal of the operational amplifier, an emitter electrode coupled to a supply potential line, and a collector electrode coupled to the base electrode of said transistor.

5. The regulator circuit as claimed in claim 3 wherein the output terminal of the operational amplifier is coupled to the base electrode of said transistor through a second transistor having a base electrode coupled to the output terminal of the operational amplifier, an emitter electrode coupled to a supply potential line, and a collector electrode coupled to the base electrode of said transistor.

6. The regulator circuit as claimed in claim 1 wherein the current path includes a transistor control element having a collector electrode coupled to the output terminal of the regulator circuit, an emitter electrode coupled to a supply potential line, and a base electrode coupled to the output terminal of the second operational amplifier.

7. The regulator circuit as claimed in claim 1 wherein means is provided for limiting current flowing in said current path.

8. The regulator circuit as claimed in claim 6 wherein means is provided for limiting current flowing in said current path.

9. The regulator circuit as claimed in claim 6 wherein means is provided for limiting current flowing in said current path, the means for limiting current comprising a further transistor having an emitter electrode coupled to a supply potential line, a collector electrode coupled to the output terminal of the second operational amplifier, and a base electrode coupled to the emitter electrode of the transistor control element.

10. A regulator circuit comprising:
an input terminal for receiving a D.C. input potential;
a transistor having an input electrode coupled to the input terminal and an output terminal for providing a regulated D.C. output potential;
an operational amplifier having a first input terminal, a second input terminal coupled to a reference potential line, and an output terminal;
a negative feedback path coupled between the output terminal of the operational amplifier and its first input terminal through said transistor as a control element; and
the regulator circuit being operative to transfer A.C. signals between the input and output terminals of the circuit by further comprising a second operational amplifier having a first input terminal coupled to receive A.C. signals present at the input terminal of the regulator circuit, a second input coupled to said reference potential line, an output terminal coupled to the first input terminal of said operational amplifier, and negative feedback means coupled between its output terminal and its first input terminal.

11. The regulator circuit as claimed in claim 1 and operative to transfer A.C. signals between the input and output terminal of the circuit, the regulator circuit further comprising a third operational amplifier having a first input terminal coupled to receive A.C. signals present at the input terminal of the regulator circuit, a second input coupled to said reference potential line, an output terminal coupled to the first input terminal of said operational amplifier, and negative feedback means coupled between its output terminal and its first input terminal.

12. The regulator circuit as claimed in claim 9 and operative to transfer A.C. signals between the input and output terminals of the circuit, the regulator circuit further comprising a third operational amplifier having a first input terminal coupled to receive A.C. signals present at the input terminal of the regulator circuit, a second input coupled to said reference potential line, an output terminal coupled to the first input terminal of said operational amplifier, and negtive feedback means coupled between its output terminal and its first input terminal.

13. The regulator circuit as claimed in claim 10 wherein the negative feedback means comprises a resistor.

14. The regulator circuit as claimed in claim 10 wherein the output terminal of the second operational amplifier is coupled to the first input terminal of said operational amplifier through a resistor.

15. The regulator circuit as claimed in claim 11 wherein the output terminal of the second operational amplifier is coupled to the first input terminal of said operational amplifier through a resistor.

16. The regulator circuit as claimed in claim 12 wherein the output terminal of the second operational amplifier is coupled to the first input terminal of said operational amplifier through a resistor.

17. The regulator circuit as claimed in claim 13 wherein the output terminal of the second operational amplifier is coupled to the first input terminal of said operational amplifier through a resistor.

18. The regulator circuit as claimed in claim 10 wherein said transistor has an emitter electrode which forms the input electrode, a collector electrode which forms the output electrode, and a base electrode, the collector electrode being coupled to the first input terminal of the operational amplifier and the output terminal of the operational amplifier being coupled to the base electrode of the transistor.

* * * * *